(12) United States Patent
Otto

(10) Patent No.: US 7,426,479 B2
(45) Date of Patent: Sep. 16, 2008

(54) CUSTOMER ACTIVITY DATA SYSTEM AND METHOD

(75) Inventor: Jerome A. Otto, Centerville, OH (US)

(73) Assignee: NCR Corporation, Dayton, OH (US)

(*) Notice: Subject to any disclaimer, the term of this patent is extended or adjusted under 35 U.S.C. 154(b) by 1099 days.

(21) Appl. No.: 10/096,052

(22) Filed: Mar. 12, 2002

(65) Prior Publication Data

US 2003/0177053 A1 Sep. 18, 2003

(51) Int. Cl.
*G06Q 10/00* (2006.01)
(52) U.S. Cl. .......................... 705/10; 235/383
(58) Field of Classification Search ................ 705/7, 705/10; 235/383
See application file for complete search history.

(56) References Cited

U.S. PATENT DOCUMENTS

| | | | | |
|---|---|---|---|---|
| 4,816,824 A | | 3/1989 | Katz et al. ............. | 340/825.34 |
| 5,151,684 A | | 9/1992 | Johnsen .................... | 340/572 |
| 5,239,167 A | | 8/1993 | Kipp ......................... | 235/383 |
| 5,649,114 A | * | 7/1997 | Deaton et al. .............. | 705/14 |
| 5,745,036 A | * | 4/1998 | Clare ..................... | 340/572.1 |
| 6,019,394 A | | 2/2000 | Chenoweth et al. .......... | 283/81 |
| 6,179,206 B1 | * | 1/2001 | Matsumori ................ | 235/383 |
| 6,448,886 B2 | * | 9/2002 | Garber et al. ............. | 340/10.1 |
| 6,837,436 B2 | * | 1/2005 | Swartz et al. .......... | 235/472.02 |
| 7,013,290 B2 | * | 3/2006 | Ananian ....................... | 705/27 |
| 2001/0013830 A1 | * | 8/2001 | Garber et al. ............ | 340/572.4 |
| 2003/0033211 A1 | * | 2/2003 | Haines et al. ................ | 705/26 |

FOREIGN PATENT DOCUMENTS

| | | |
|---|---|---|
| DE | 19921748 | 11/2000 |
| EP | 0961253 | 12/1999 |
| JP | 2001022777 A * | 1/2001 |
| WO | WO 99/05659 | 2/1999 |
| WO | WO 01/18732 | 3/2001 |

OTHER PUBLICATIONS

Want, Roy; Russell, David M; "Ubiquitous Electronic Tagging", Dec. 1999, IEEE Concurrency, pp. 1-6.*
Want, et.al.; "Bridging Physical and Virtual Worlds with Electronic Tags", Apr. 1999, Proceedings of CHI'99, ACM Press, pp. 1-8.*
Knorr, Edwin; "On Digital Money and Card Technologies", Jan. 20, 1997, Department of Computer Science, University of British Columbia, Vancouver, Canada, pp. 1-24.*
Wan, Dadong; "Magic Home: Exploiting the Duality between the Physical and the Virtual Worlds", 2000 Conference on Human Factors in Computer Systems (CHI 2000), Center for Strategic Technology Research, Andersen Cosulting, pp. 1-2.*

(Continued)

*Primary Examiner*—Jonathan G Sterrett
(74) *Attorney, Agent, or Firm*—Paul W. Martin; Priest & Goldstein PLLC

(57) ABSTRACT

A customer activity data system and method which generate reports for manufacturers, sellers, and other suppliers. The system includes a computer for analyzing transaction data obtained from a transaction terminal and information characterizing customer activity at an information terminal specific to an item bearing a radio frequency identification (RFID) label, and for generating a report.

15 Claims, 2 Drawing Sheets

OTHER PUBLICATIONS

Anonymous, "Fast-food chains to test TIRIS technology to speed checkouts", Jul. 14, 1997, Nation's Restaurant News v31n28 pp. 78, Dialog 01476569 01-27557.*

Francella, Barbara Grondin, "RFID : The Next Generation", Jan. 11, 1999, Convenience Store News, v34, n1, p. 65(1) Dialog 06105482 Supplier No. 53682509.*

Anonymous, "Winning in the 21st century: technology to transform retail", Dec. 15, 1993, Chain Store Age Executive with Shopping Center Age, v69, nSPEISS, p. 58(6), Dialog 6800292 Supplier No. 14981659.*

Welling, Holly; "Unveiling AIM's store of the future", part I, Apparel Industry Magazine. Atlanta: Feb. 2000.vol. 61, Iss. 2; p. 24, 6 pgs.*

Clicks, bricks and other tricks in POS market □□Doug Wood. Computer Dealer News. Willowdale: Mar. 24, 2000.vol. 16, Iss. 6; p. 33, 1 pgs.*

Operations management: Challenges in food retailing □□Parker, David, Gulliford, James. Management Services. Enfield: Apr. 1996. vol. 40, Iss. 4; p. 10, 5 pgs.*

Scanning errors likely to take toll on customer satisfaction □□Triplett, Tim. Marketing News. Chicago: Aug. 1, 1994.vol. 28, Iss. 16; p. 1, 2 pgs.*

Leaving the safety of the big box Anonymous. Chain Store Age. New York: Aug. 1997. p. 24A, 5 pgs.*

Seamlessly, Dayton Hudson puts handhelds to broader use Anonymous. Chain Store Age. New York: Sep. 1995.vol. 71, Iss. 9: Sec. 3. p. 12B, 2 pgs.*

The wireless store Anonymous. Chain Store Age Executive with Shopping Center Age. New York: Nov. 1993.vol. 69, Iss. 11; Sec. 1. p. 49, 7 pgs.*

Scanning technologies: The next chapter Anonymous. Chain Store Age. New York: Jan. 2002.vol. 78, Iss. 1; p. 5A, 2 pgs.*

High-tech devices speed customer throughput Anonymous. Foodservice Director. New York: Oct. 15, 2001.vol. 14, Iss. 10; p. 12, 1 pgs.*

Beyond barcodes: Radio frequency ID technology creates new supply chain BI David Butler. Intelligent Enterprise. San Mateo: Oct. 4, 2001.vol. 4, Iss. 15; p. 12, 2 pgs.*

Anonymous, "Mobile POS: Taking it to the customer", retrieved from the web at: http://www.intermec.com/eprise/main/Intermec/Content/About/getArticle?ArticleID=128#.*

Anonymous, "RFID Labels deliver", retrieved from the web at: http://www.intermec.com/eprise/main/Intermec/Content/About/getArticle?ArticleID=133#.*

Monroe, Kent B; Lee, Angela Y; "Remembering Versus Knowing: Issues in Buyer's Processing of Price Information", Spring 1999; Academy of Marketing Science, 27, 2; ABI/INFORM Global, p. 207.*

Marmorstein, et al.; "The Value of Time Spent in Price-Comparison Shopping: Survey and Experimental Evidence", Jun. 1992, The Journal of Consumer Research, vol. 19, No. 1, pp. 52-61.*

Mazumdar, Tridib; Monroe, Kent; "Effects of Inter-store and In-Store Price Comparisons on Price Recall Accuracy and Confidence", Spring 1992, Journal of Retailing, 68, 1; ABI/INFORM Global, p. 66.*

Burke et al; "Comparing Dynamic Consumer Choice in Real and Computer-Simulated Environments", Jun. 1992, The Journal of Consumer Research, vol. 19, No. 1, pp. 71-82.*

Fotheringham, A. Stewart; "Consumer Store Choice and Choice Set Definition", Summer 1998, Marketing Science, vol. 7, No. 3, pp. 299-310.*

Gurumurthy, Kal; Winer, Russell S.; Empirical Generalizations from Reference Price Research, 1995, Marketing Science, vol. 14, No. 3. pp. G161-G169.*

Messinger, Paul R; Narasimhan, Chakravarthi; "A Model of Retail Formats Based on Consumers' Economizing on Shopping Time", 1997, Marketing Science, vol. 16 No. 1, pp. 1-23.*

Mazumdar, Tridib; Monroe, Kent; "The Effects of Buyers' Intentions to Learn Price Information on Price Encoding", Spring 1990, Journal of Retailing, 66, 1; ABI/INFORM Global, p. 15.*

* cited by examiner

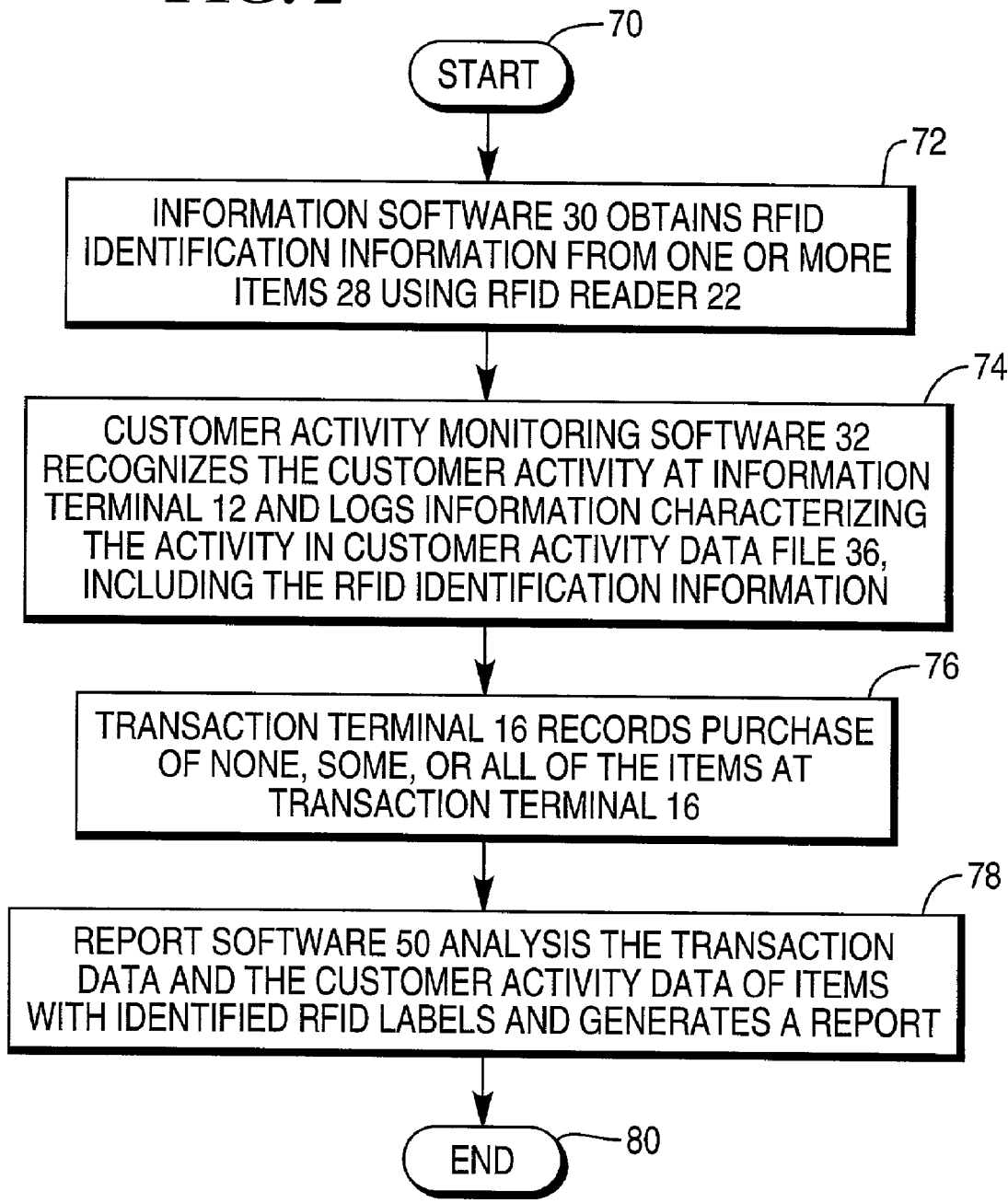

CUSTOMER ACTIVITY DATA SYSTEM AND METHOD

BACKGROUND OF THE INVENTION

The present invention relates generally to point of sales (POS) terminals, and, more specifically, to a customer activity data system and method.

RFID technology provides an alternative to bar code reader technology for distinguishing and recording items for purchase. Some of the uses of RFID technology are disclosed in U.S. Pat. No. 6,019,394 assigned to the assignee of the present invention. This patent is hereby incorporated by reference.

Price verifiers have been introduced into stores to complement point-of-sale (POS) terminals. Like POS terminals, price verifiers include a barcode reader for reading a barcode label on an item. Price verifiers determine prices from a price look-up file (PLU) file shared with the POS terminals.

Manufacturers and retailers manage the various categories of items displayed in a retail store based primarily on items sold and on quantities of items sold. This data is obtained from inventory records as products are sold.

Merchandise management information may be obtained from a price verifier. For example, a customer may use a price verifier to scan two similar products from two different manufacturers. Other activities are also possible.

U.S. Pat. No. 6,246,995 entitled, "Product Activity Data Collection System", describes the use of a Price Verifier to enhance merchandise management in a retail store. However, without item identification information, this method produces data which is only marginally useful.

Therefore, it would be desirable to provide a system and method of collecting item activity data to improve promotion of compared items.

SUMMARY OF THE INVENTION

In accordance with the teachings of the present invention, a customer activity data system and method is provided.

The system includes a computer for analyzing transaction data obtained from a transaction terminal and information characterizing customer activity at an information terminal specific to an item bearing a radio frequency identification (RFID) label, and for generating a report.

It is accordingly an object of the present invention to provide a customer activity data system and method.

It is another object of the present invention to provide a system and method of collecting and analyzing customer activity data.

It is another object of the present invention to collect customer activity data during reading of RFID labels attached to items.

It is another object of the present invention to collect customer activity data from a price verifier.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 2 is a flow diagram illustrating the method of the present invention.

DETAILED DESCRIPTION OF THE PREFERRED EMBODIMENT

Figure 1:
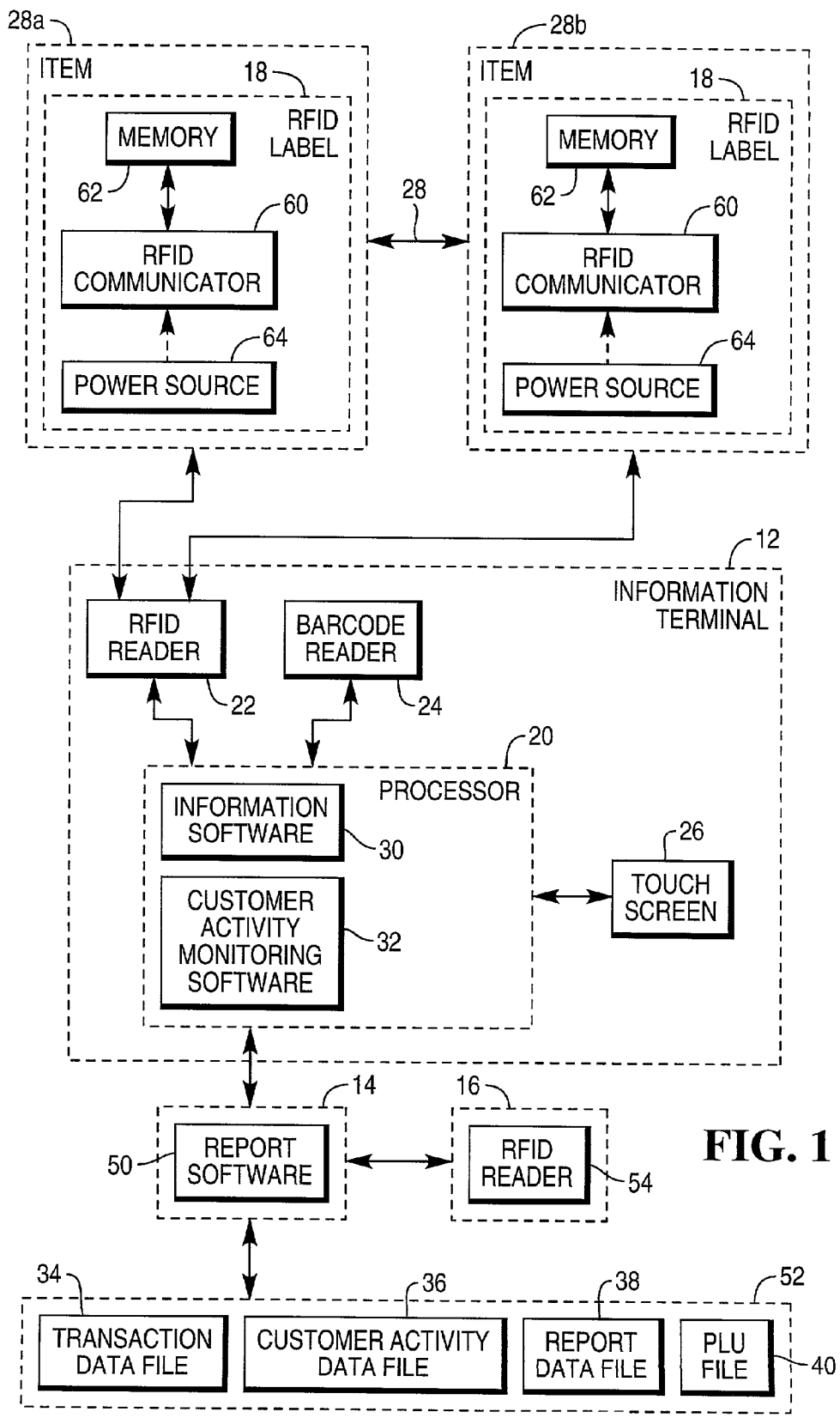
FIG. 1 is a block diagram of a transaction processing system.

Referring now to FIG. 1, system 10 primarily includes information terminal 12, information server 14, transaction terminal 16, and radio frequency identification (RFID) labels 18.

Information terminal 12 provides item information to customers. Information terminal 12 may include a kiosk, such as a price verifier. An example information terminal 12 includes processor 20, RFID reader 22, barcode reader 24, touch screen 26, and storage medium 28.

Processor 20 executes information software 30 which identifies items 28 presented by customers and displays information about items 28. Information software 30 may obtain such information locally or from server 14.

For example, information software 30 may provide price information to customers. In this role, information software 30 causes one or both of RFID reader 22 and barcode reader 24 to seek information from items 28. Information software 30 identifies items 28 from the obtained information and requests price information from information server 14. Information server 14 returns the requested price information from price look-up (PLU) file 40 to information software 30 and information software 30 displays the information on touch screen 26.

Processor 20 also executes customer activity monitoring software 32 which recognizes predetermined types of customer activity at information terminal 12. Types of customer activity include information gathering, such as price checks, and purchases. Customer activity monitoring software 32 logs information characterizing the activity in customer activity data file 36. Customer activity data file 36 may be stored locally or at server 14.

Server 14 provides information to information terminal 12 and transaction terminal 16. The information is typically price information. Server 14 additionally executes report software 50, which analyses relationships between data from transaction data file 34 and data from customer activity data file 36 to provide insights to store management and to manufacturers and other suppliers. Server 14 stores reports in report data file 38.

Transaction terminal 16 records sales of items. For this purpose, transaction terminal includes RFID reader 54, which reads RFID labels 18 on purchased items. Transaction terminal 16 stores transaction information in transaction data file 34.

Storage medium stores transaction data file 34, customer activity data file 36, report data file 38, and PLU file 40. Some of these files may also be stored locally in information terminal 12 or transaction terminal 16.

RFID labels 18 store information about items and communicate the information to RFID readers 22 and 54. One embodiment of RFID label 18 is active and includes RFID communicator 60, memory 62, and power source 64. RFID communicator 60 sends item information stored in RFID memory 62 to RFID readers 22 and 54. RFID communicator 60 may include an RF transceiver.

Memory 62 stores the information and may include a read-only memory (ROM) for one-time use, or a programmable ROM (EPROM) for repeated use.

Power source 64 may include a battery.

RFID label 18 may also be a passive label. Passive RFID labels use very little energy and may only include RFID communicator 60. Power may be derived from radio waves.

RFID communicator 60 may include a reflective antenna which has a frequency which is unique among RFID labels

18. RFID communicator 60 communicates RFID label identification information which must be cross-referenced to obtain item identification information. RFID communicator 60 may include a number of antennas, such as conductive ink antennas.

RFID labels 18 may vary in size, depending upon product size, and may be visible or hidden when attached to products. RFID label 18 may be removably or permanently attached to products.

In one example operation, customer activity monitoring software 32 recognizes comparison price checks on different items 28a and 60b at information terminal 12. Customer activity monitoring software 32 obtains RFID label identification information from items 28a and 60b and stores the RFID label identification information in customer activity data file 36.

This information, linked with purchase information from transaction terminal 16 in transaction data file 34 could provide valuable insight to sellers, manufacturers, and suppliers of items 28a and 60b. The information could answer questions like "whose product was compared to mine when mine was purchased", "whose product was compared to mine when mine was not purchased", "was my product examined but not compared to any other product", "was my product examined but not purchased", "was my product examined and purchased", and "was my product examined and were complementary or related items purchased".

Advantageously, capture of RFID identification information facilitates a higher level of accuracy in merchandising data.

Turning now to FIG. 2, operation is further illustrated in more detail beginning with START 70.

In step 72, information software 30 obtains RFID identification information from one or more items 28 using RFID reader 22.

In step 74, customer activity monitoring software 32 recognizes the customer activity at information terminal 12 and logs information characterizing the activity in customer activity data file 36, including the RFID identification information.

In step 76, transaction terminal 16 records purchase of none, some, or all of the items at transaction terminal 16. Transaction terminal 16 stores the transaction data, including the RFID identification numbers, in transaction data file 34.

In step 78, report software 50 analyzes the transaction data and the customer activity data of items with identified RFID labels and generates a report.

In step 80, operation ends.

Store management, suppliers, and manufacturers benefit from seeing how customers react to specific products. They can use the report information to alter the products or how they sell the products.

Although the present invention has been described with particular reference to certain preferred embodiments thereof, variations and modifications of the present invention can be effected within the spirit and scope of the following claims.

I claim:

1. A method of tracking customer activity comprising the steps of:

receiving customer prepurchase activity information from an information terminal operative to present to a customer product information related to an item presented at the information terminal, the customer prepurchase activity linked to the item presented based on item information from a radio frequency identification (RFID) label on the item;

receiving subsequent customer purchase activity information from a transaction terminal, the subsequent customer purchase information including item information from RFID labels on purchased items;

analyzing the subsequent customer purchase activity information obtained from the transaction terminal and the customer prepurchase activity information from the information terminal to identify relationships between customer prepurchase activity taking place at the information terminal before a customer has made a purchase decision, and purchase activity undertaken at the transaction terminal; and generating a report presenting an analysis of identified relationships between customer prepurchase activity and purchase activity.

2. A method of tracking customer activity comprising the steps of:

obtaining radio frequency identification (RFID) information from an RFID label on an item presented for a price check by a customer to a price verifier;

recognizing customer activity related to the item, including customer prepurchase activity carried put at the price verifier;

storing information characterizing the customer prepurchase activity;

recording transaction data for a subsequent purchase of the item by the customer;

analyzing the transaction data and the information characterizing the customer prepurchase activity to identify relationships between customer prepurchase activity for an item taking place at the information terminal before a customer has made a purchase decision, and transaction data for the subsequent purchase of the item; and generating a report presenting an analysis of the transaction data and the information characterizing the customer activity, the report including information relating to identified relationships between customer prepurchase activity for the item and subsequent purchase of the item.

3. The method of tracking customer activity as recited in claim 2, further comprising:

recognizing comparison price checks on two different items at the price verifier utilizing customer activity monitoring software.

4. The method of tracking customer activity as recited in claim 3, further comprising:

obtaining RFID label identification information from the two different items;

storing the RFID label identification information from the two different items in a customer activity data file; and linking purchase information from the transaction terminal.

5. The method of tracking customer activity as recited in claim 4, further comprising:

determining whether a related item was purchased.

6. A system for tracking customer activity comprising:

a computer for analyzing transaction data obtained from a transaction terminal which records sales of items and identifies RFID label identification information for items involved in sales transactions, and information characterizing customer prepurchase activity at an information terminal operative to present to a customer product information related to items having RFIDs label presented at the information terminal, the information terminal obtaining RFID label identification information from the items presented, and linking the transaction data for a particular item bearing an RFID label and the information characterizing customer prepurchase activity for one or more items bearing the (RFID) labels, and presented to the information terminal prior to sale of the particular item, and for generating a report presenting an analysis of the transaction data and the information characterizing the customer prepurchase activity at the information terminal, the analysis including identifying relationships between prepurchase activity at the information terminal for the customer and transaction data for the customer.

7. A system for tracking customer activity comprising:
an information terminal including
- a radio frequency identification (RFID) label interrogator for reading RFID label identification information from an RFID label on an item carried by a customer; and
- a first computer which recognizes the customer activity related to the item and stores information characterizing the customer activity linked with the RFID label identification information, the activity being an activity engaged in by the customer before a purchase transaction, the information characterizing the customer activity identifying the particular activity and the item subject to the activity;

a transaction terminal for recording transaction data for customer purchase of items; and a second computer coupled to the transaction terminal and the information terminal for analyzing the transaction data and the information characterizing the customer activity engaged in by the customer before the purchase transaction, and for generating a report presenting an analysis of the transaction data and the information characterizing the customer activity, the analysis including identifying relationships between customer prepurchase activity for an item undertaken at the information terminal before the customer has made a purchase, and transaction activity for purchases of items undertaken at the transaction terminal.

8. The system as recited in claim 7, wherein the second computer recognizes comparison price checks on two different items.

9. The system as recited in claim 8, wherein the second computer stores RFID label identification information from the two different items,
  determines whether the items were purchased, and takes the determination into account in performing the analysis.

10. The system as recited in claim 9, wherein the second computer also determines whether a related item was purchased.

11. The method of tracking customer activity as recited in claim 1, including using the item identification from the RFID label to specifically identify that the same unit of an item was presented at the information terminal and subsequently purchased and determining from the circumstances relating to the presentation and the subsequent transaction whether the presentation and the subsequent purchase were performed by the same customer.

12. The method of tracking customer activity as recited in claim 3, wherein identifying relationships between customer prepurchase activity and transaction activity for a subsequent purchase of the item includes noting whether only one of two different items presented at a price verifier was subsequently purchased and which of the two different items was purchased.

13. The method of tracking customer activity as recited in claim 5, wherein determining whether a related item was purchased includes noting whether the item presented at the price verifier and a related item were purchased in the same transaction.

14. The system as recited in claim 6, wherein identifying relationships between customer prepurchase activity and customer transaction activity includes determining whether an item presented at the information terminal was subsequently purchased.

15. The system as recited in claim 6, wherein identifying relationships between customer prepurchase activity and customer transaction activity includes determining whether a purchased item had been previously presented at the information terminal.

* * * * *